US007734659B2

(12) United States Patent
Lori

(10) Patent No.: US 7,734,659 B2
(45) Date of Patent: Jun. 8, 2010

(54) SYSTEM AND METHOD FOR CREATING AN OBJECT MODEL

(75) Inventor: Jonathan Blake Lori, Oxford, CT (US)

(73) Assignee: United Technologies Corporation, Hartford, CT (US)

( * ) Notice: Subject to any disclaimer, the term of this patent is extended or adjusted under 35 U.S.C. 154(b) by 340 days.

(21) Appl. No.: 11/809,493

(22) Filed: Jun. 1, 2007

(65) Prior Publication Data

US 2008/0301181 A1 Dec. 4, 2008

(51) Int. Cl.
*G06F 7/00* (2006.01)
*G06F 17/30* (2006.01)

(52) U.S. Cl. .................................. 707/802; 707/810
(58) Field of Classification Search ................. 707/3–6, 707/102–103, 755, 756, 791, 802, 803, 810; 701/29, 30; 702/182
See application file for complete search history.

(56) References Cited

U.S. PATENT DOCUMENTS

| 5,408,412 | A | | 4/1995 | Hogg et al. ............. 364/424.03 |
| 6,003,808 | A | | 12/1999 | Nguyen et al. .............. 244/1 R |
| 6,067,486 | A | * | 5/2000 | Aragones et al. ............. 701/29 |
| 6,125,312 | A | | 9/2000 | Nguyen et al. ............... 701/35 |
| 6,408,258 | B1 | * | 6/2002 | Richer ....................... 702/182 |
| 6,622,136 | B2 | * | 9/2003 | Russell ........................ 706/45 |
| 6,728,610 | B1 | * | 4/2004 | Marshall et al. .............. 701/30 |
| 6,871,160 | B2 | | 3/2005 | Jaw ............................ 702/182 |
| 7,103,593 | B2 | | 9/2006 | Dean ............................. 707/5 |
| 7,143,007 | B2 | | 11/2006 | Long et al. ................. 702/184 |
| 2002/0184210 | A1 | * | 12/2002 | Khan ............................. 707/6 |

FOREIGN PATENT DOCUMENTS

WO        WO0146014 A1    6/2001

OTHER PUBLICATIONS

Lincoln M. Oliveira et al. . "Managing time in Object-Oriented Database".*
Official Search Report and Written Opinion of the European Patent Office in counterpart Foreign Application No. 08251827.5 filed May 27, 2008 (8 pages).
Won Kim et al., "Composite Object Support in an Object-Oriented Database System", Object-Oriented Programming Systems, Languages and Applications Conference, Oct. 1987 (pp. 118-125).
L. M. Oliveira et al., "Managing Time in Object-Oriented Databases", http://www.dcc.unicamp.br/ic-tr-ftp/1993/93-14.ps.gz, 1993 (34 pages).

(Continued)

*Primary Examiner*—Hung T Vy
(74) *Attorney, Agent, or Firm*—Kinney & Lange, P.A.

(57) ABSTRACT

A method for creating a dynamic domain model of an object. The method includes storing and organizing temporal information about the object in a bitemporal database that includes both a valid time and a transaction time for the information. The information is inserted into a plurality of tables in the database and a key is assigned to each of the plurality of tables. A composite representing the object is formed to represent a state of the object at the current time or at any previous time by dynamically linking the information by key, based on a business logic and a request made by a user.

11 Claims, 10 Drawing Sheets

OTHER PUBLICATIONS

A. Artale et al., "Reasoning with Enhanced Temporal Entity-Relationship Models", IEEE, 1999, (pp. 482-486).

H. Gregersen et al., "Temporal Entity-Relationship Models—A Survey", IEEE Transactions on Knowledge and Data Engineering, vol. 11, No. 3, May/Jun. 1999 (pp. 464-497).

C. Njovu et al., "A Design Pattern Approach to Bitemporal Data Modelling", Proceedings of the 14th Int'l. Workshop on Database and Expert Systems Applications, 2003 (4 pages).

Yoder et al. "The Adaptive Object-Model Architectural Style". <http://www.adaptiveobjectmodel.com/WICSA3/ArchitectureOfAOMsWICSA3.pdf>.

* cited by examiner

SYSTEM AND METHOD FOR CREATING AN OBJECT MODEL

BACKGROUND OF THE INVENTION

1. Field of the Invention

The present disclosure relates to the creation of object models. More specifically, the present disclosure relates to the creation of dynamic software models of real world entities, while allowing for lossless processing and reversible changes in the entities, as well as in the characteristics and history of the entities.

2. Description of Related Art

Most object-oriented systems have classes for describing the different types of business entities and their associated attributes and methods. The classes model the business, so a change in the business leads to a change in the code. This requires a programmer to create an entirely new version of the software application. Most object-oriented languages structure a program as a set of classes. A class defines the structure and behavior of objects. Thus, a new class is generally needed for each new kind of object that is encountered. For large and complex systems, this leads to the problem of having a class in which an unknown number of subclasses must be formed.

There is therefore a need for systems and methods for efficiently processing, tracking, and recalculating information without the need for extensive programming, when the underlying attributed structure may be modified over time, while processing reversible changes in the data attributes over time.

BRIEF SUMMARY OF THE INVENTION

A method is provided for creating a dynamic domain model of an object. The method comprises storing and organizing temporal information about the object in a bitemporal database that includes both a valid time and a transaction time for the information. The information is inserted into a plurality of tables in the database and a key is assigned to each of the plurality of tables. A composite representing the object is formed to represent a state of the object at the current time or at any previous time by dynamically linking the information by key, based on a business logic and a request made by a user.

A system for creating a dynamic domain model of an object is also provided. The system includes a bitemporal database storing temporal information about the object, a relational database management system managing the bitemporal database, an object relational mapper, and a business logic component. The database includes both a valid time and a transaction time for the information. The object relational mapper converts the information in the database into a composite representing the object, and the composite is formed by dynamically linking tables within the database based on relationships defined by the business logic component. The composite represents a state of the object at the current time or any previous time.

DETAILED DESCRIPTION OF THE PREFERRED EMBODIMENTS

Figure 1:
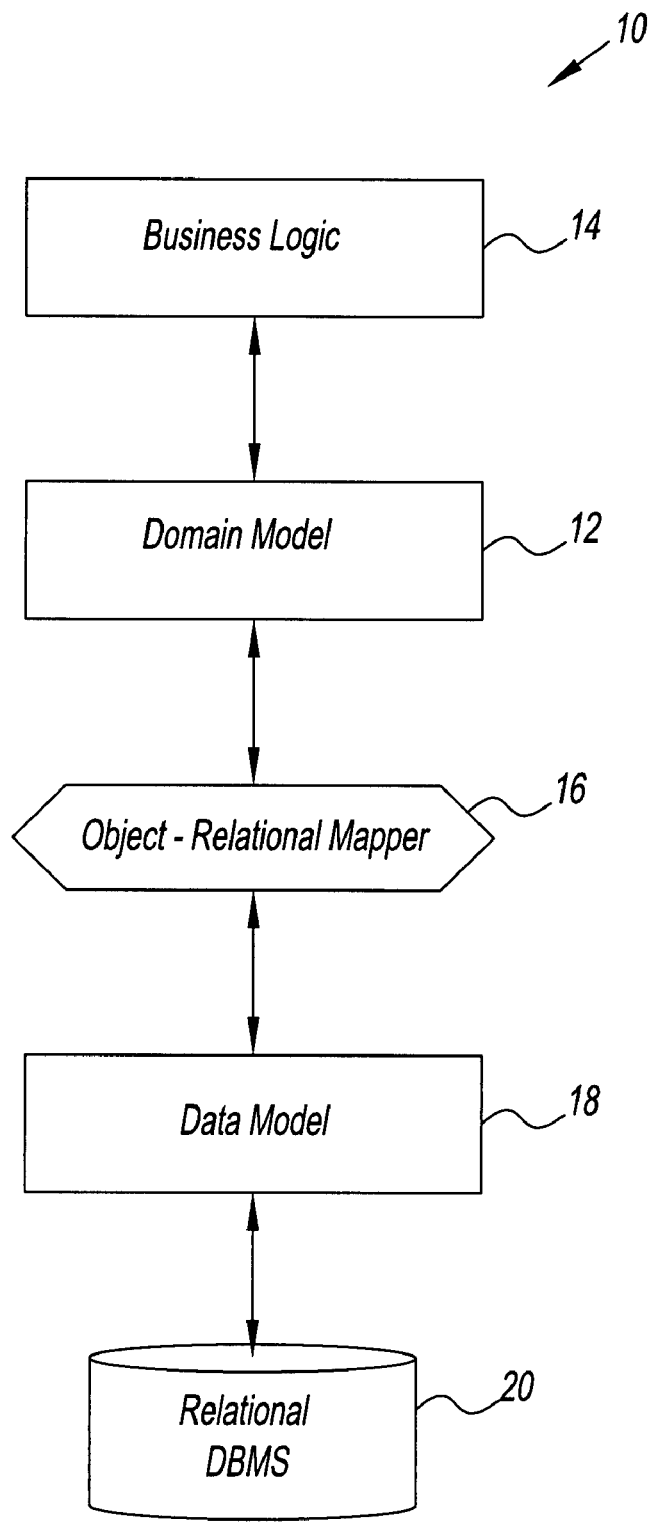
FIG. 1 is a schematic depicting the system of the present disclosure.

Referring to the drawings and, in particular, to FIG. 1, there is provided a schematic of a system generally represented by reference numeral 10. System 10 creates an object model or domain model 12. Domain model 12 typically represents an abstraction of a physical, real world object. Domain model 12 contains information about various entities or subassemblies of the real world object, as well as information about the relationships between the entities. System 10 includes a business logic component 14, which defines the relationships between entities within domain model 12. System 10 also includes an object-relational mapper 16, data model 18, and relational database management system (DBMS) 20. Relational DBMS 20 manages data model 18, and object-relational mapper converts data contained within data model 18 into domain model 12. In one preferred embodiment, domain model 12 represents an aircraft engine. However, those skilled in the art will recognize that system 10 can be used to model any type of object or entity. Domain model 12 includes a flexible and dynamic semantic structure allowing for extensible software representations of objects, characteristics, and attributes, while providing a basis for maintaining a history of the manipulation of the objects, characteristics, and attributes over time. Thus, system 10 implements a method for processing, tracking, and calculating information regarding an object of interest where the representative structure of the object, characteristics of the structure, and the temporal history of both the structure and the characteristics of its components may be easily tracked and modified over time. System 10 is therefore able to rematerialize the representative state of the object at an arbitrary time in the past.

Figure 2:
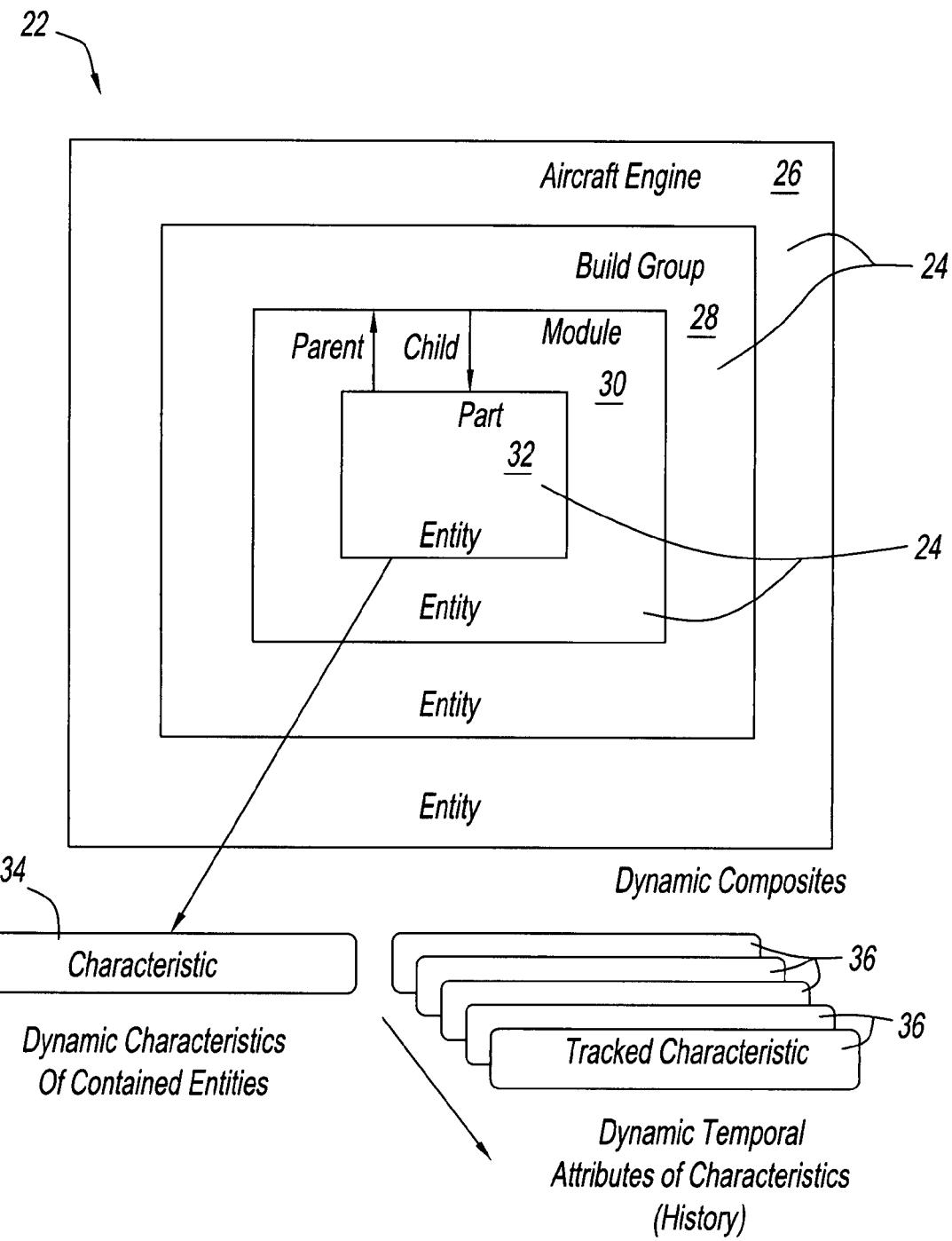
FIG. 2 is schematic depicting a composite as described in the present disclosure.

FIG. 2 illustrates a dynamic composite 22, which is a component of domain model 12. Domain model 12 may have a single composite 22 or may be made up of a plurality of composites 22. Domain model 12 represents a real world object, or some other object of interest, and composite 22 represents an arbitrarily complex assembly of the object. Composite 22 is made up of individual entities 24. A generic entity-relationship model is established within composite 22, and the composite provides an arbitrarily wide and arbitrarily deep composition as a principal organizational mechanism. For example, in one embodiment as shown in FIG. 2, domain model 12 of FIG. 1 includes a composite representing an aircraft engine. In such a case, an arbitrary relationship, as defined by business logic component 14, can be established between arbitrary entities as follows: an engine 26 contains build groups 28, which contain modules 30, which contain parts 32. Composite 22 provides for bi-directional and recursive relationships. Any entity 24 in the composite can find its child or parent entity, and any composite 22 can contain other composites. Composite 22 can therefore represent notions of inheritance ("is a"), ownership ("owns"), containment ("has a"), as well as composition ("part of").

Figure 3:
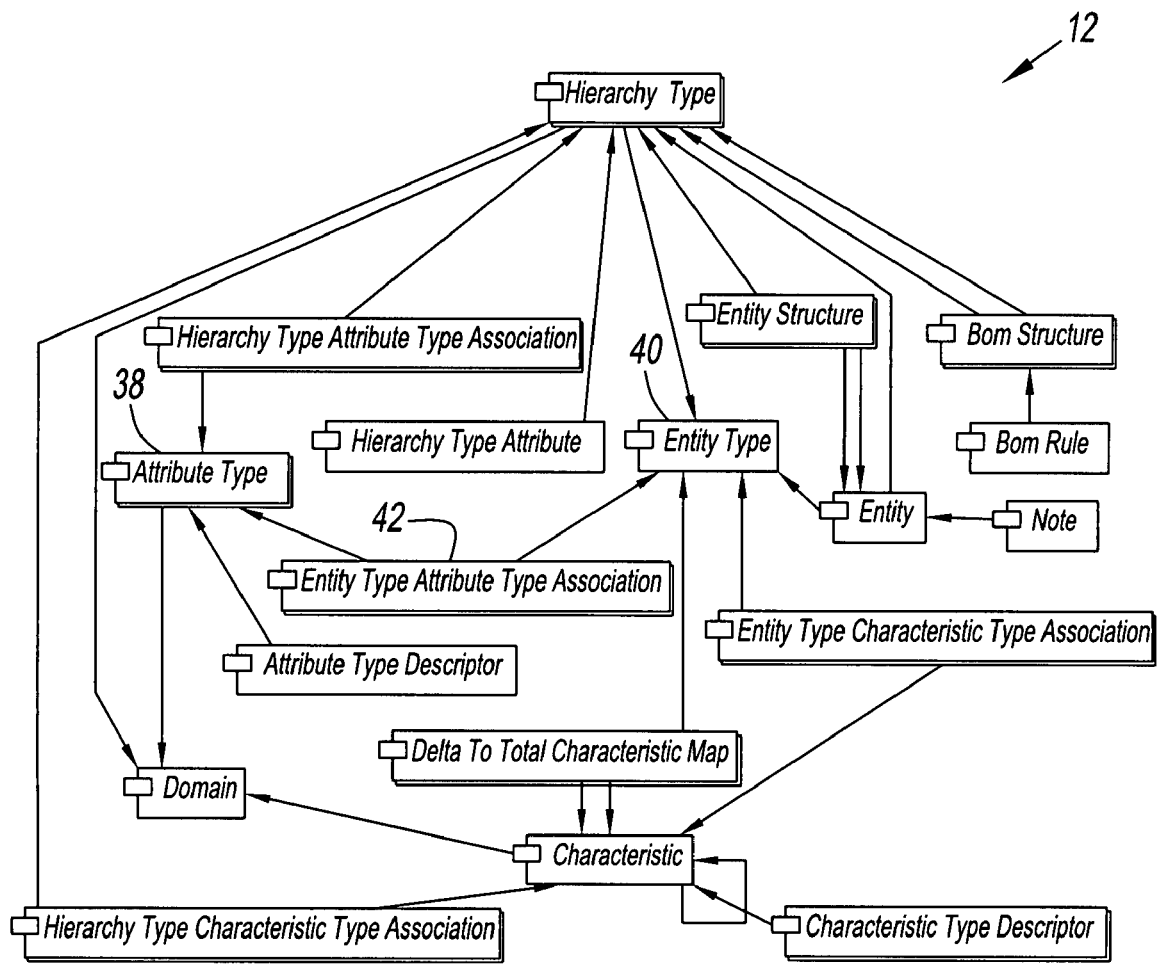
FIG. 3 is a class diagram of the core object model of the system of the present disclosure.

FIG. 3 illustrates the core structure of domain model 12. As seen in FIG. 3, relationships between objects are represented as data. For example, an attribute type object 38 and an entity type object 40 are connected by an association object 42.

In one embodiment, system 10 implements a mirrored generic data model coupled with a mirrored generic domain model. The mirrored models can impose an overarching relationship on composite 22, which is an arbitrary subset of information. The mirrored models organize temporal information and processing into a bitemporal database. A bitemporal database is a database that includes both valid time and transaction time of the data it contains. Facts are stored in the bitemporal database at a point in time. After the fact is stored, it can be retrieved. The time when a fact is stored in the database is the transaction time of the fact. Transaction times are consistent with the serial order of the transactions. Transaction times cannot be changed. A transaction time also cannot be later than the current time. Typically, the commit time of a database transaction is used as the transaction time.

Referring again to FIG. 2, each entity 24 of composite 22 can also include characteristics 34. Characteristic 34 can include an attribute 36. Attribute 36 can be used to associate historical information with characteristic 34, and thus by relationship, entity 24 and composite 22. The characteristic/attribute mechanism can be used to "decorate" any specific entity 24 or composite 22 any number of times. This approach enables the creation of flexible and dynamic software models of real world objects, while allowing for lossless processing and reversible changes in the entities 24, characteristics 34, and their attributes 36. Thus, system 10 provides full support for slowly changing data and late-arriving edits. System 10 also maintains processing history by building and storing these successive states.

Figure 4:
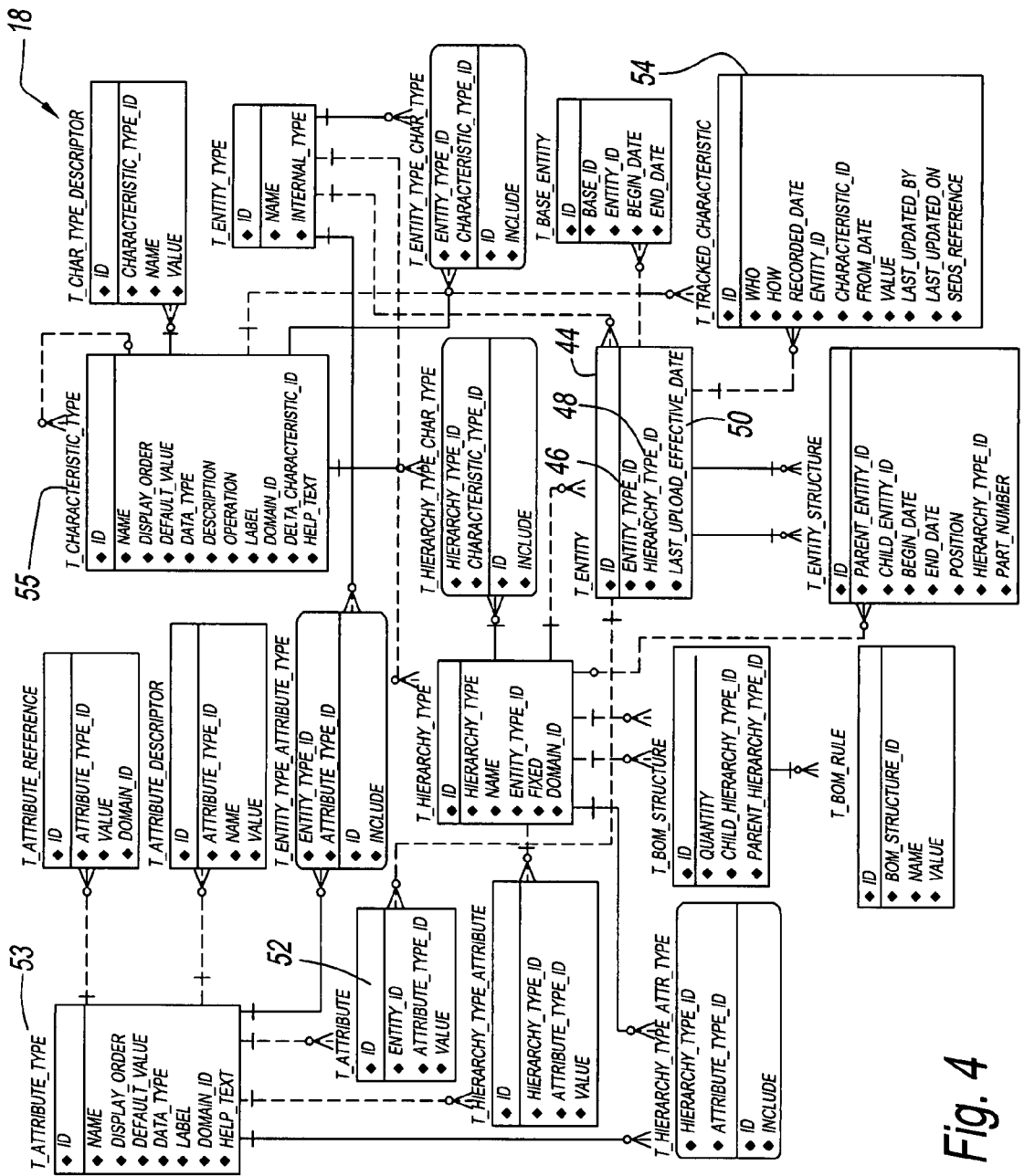
FIG. 4 is an entity relationship diagram of the data model of the system of the present disclosure.

FIG. 4 illustrates the relationships between tables in data model 18. For example, a table 44 representing an entity 24 will include at least three fields: entity type 46, hierarchy type 48, and last upload effective date 50. An entity 24 may have several attributes, as identified in attribute table 52. However, an attribute will be associated with only one attribute type 53. Similarly, an entity 24 may have several tracked characteristics or attributes 36, represented by table 54 and having a characteristic type represented by table 55.

Figure 5A:
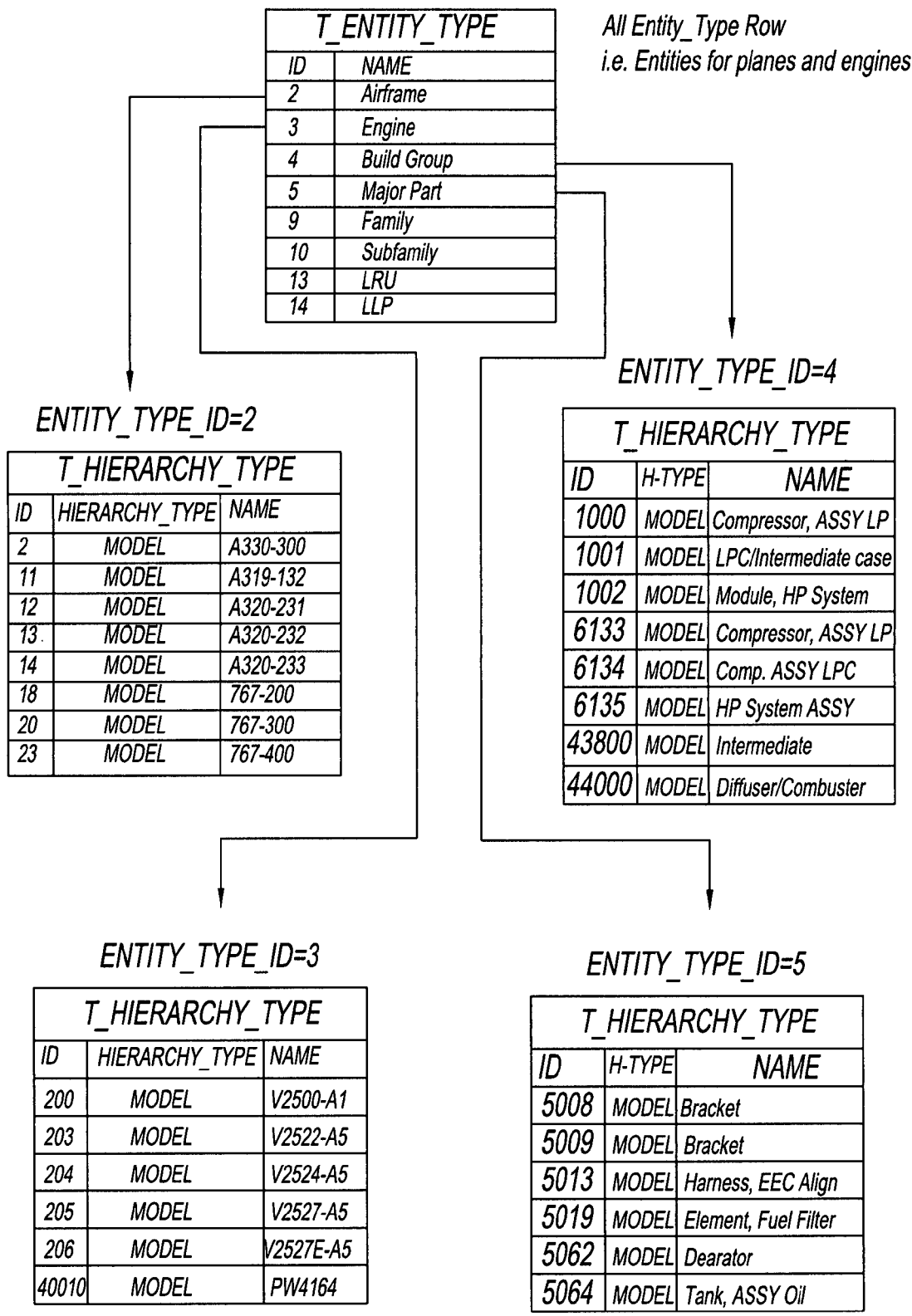
FIG. 5A is a diagram showing the relationships between entity tables and hierarchy tables in a database of the system of the present disclosure.
Figure 5B:
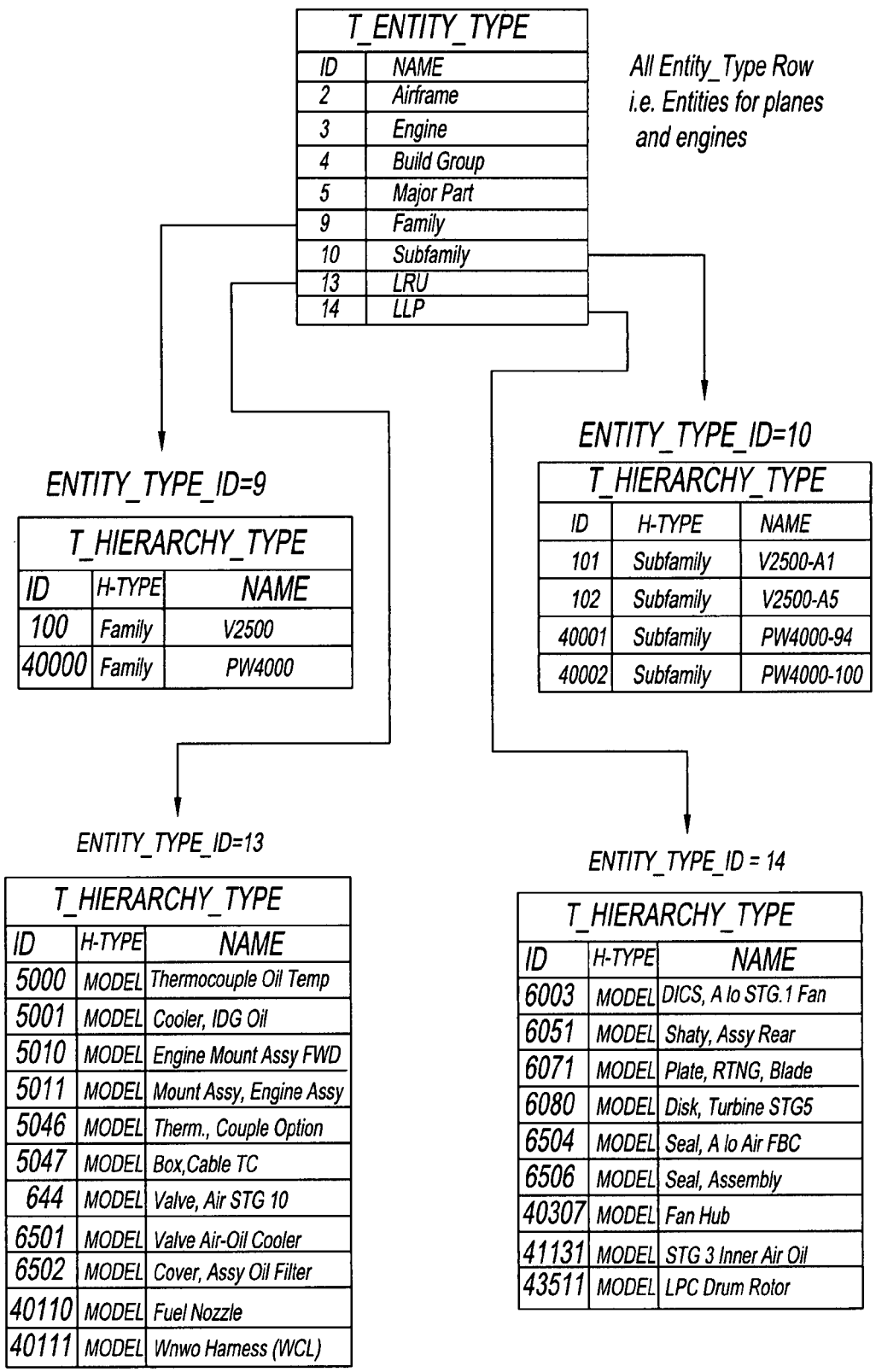
FIG. 5B illustrates additional hierarchy tables in a database of the system of the present disclosure.

FIGS. 5A and 5B show an embodiment of tables within database 20 of system 10 where system 10 is used for tracking the configuration and utilization of an aircraft engine. Each entity 24 represented by the data model 18 includes entity type 46 and hierarchy type 48. The values for entity type 46 and hierarchy type 48 are determined by business logic component 14. For example, as shown in FIG. 5A, any number of entity types can be defined, including airframe, engine, build group, major part, family, subfamily, Line Replaceable Unit (LRU), and Life Limited Part (LLP). Each entity type is assigned a name and a unique entity type ID number. ID numbers are used as keys to associate one table with one or more other tables. Hierarchy types are defined as subsets of each entity type. For example, subsets of the engine entity type could include hierarchy types representing different models of engines.

Figure 6:
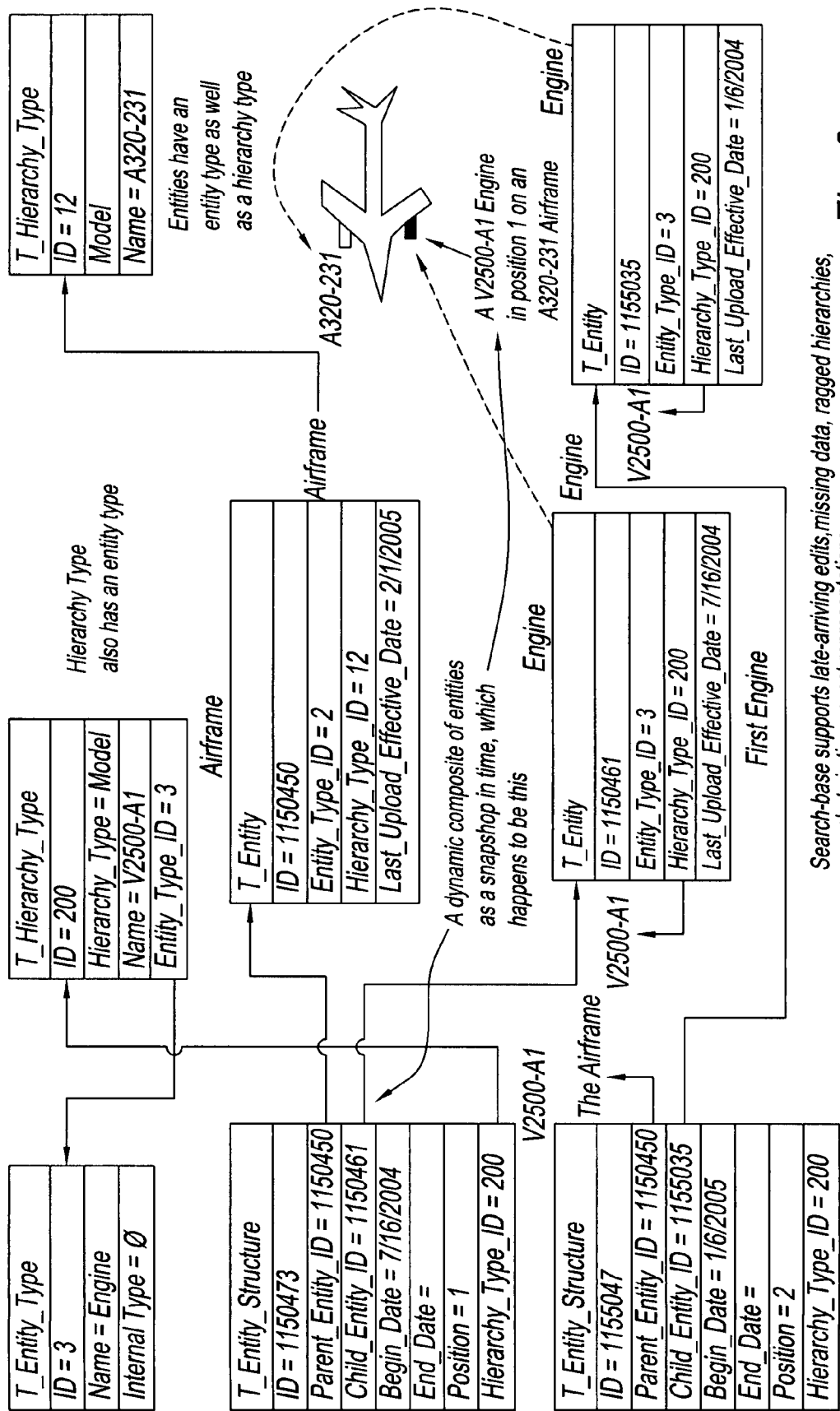
FIGS. 6 and 7 illustrate the relationship between entities in the system of the present disclosure.
Figure 7:
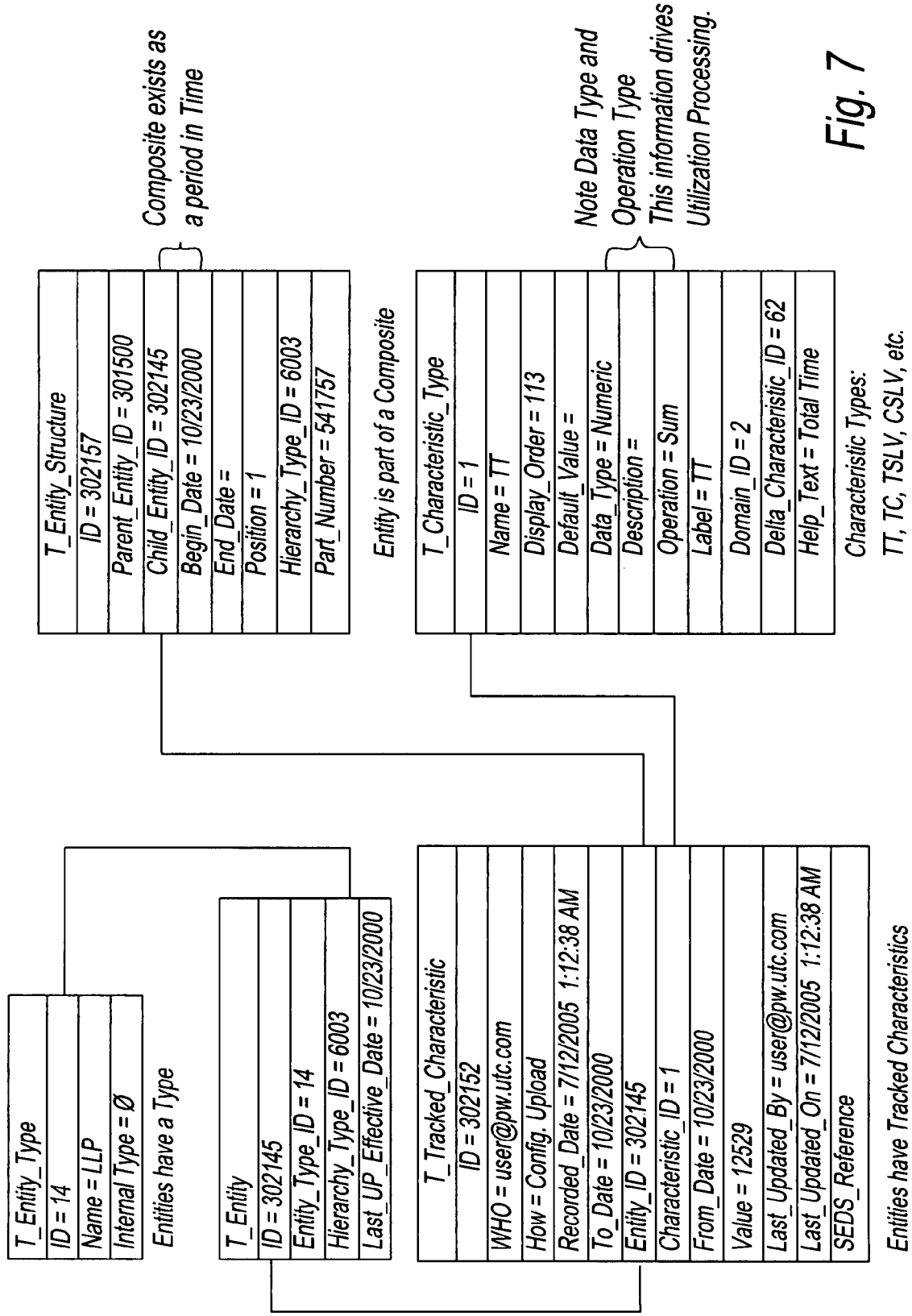

FIGS. 6 and 7 illustrate the relationships between entities. FIG. 6 shows three entities: an airframe and two engines in first and second positions associated with the airframe. Each entity table includes a field for ID number, entity type ID number, hierarchy type ID number, and a value for last update effective date. The entity table is linked to an entity structure table that identifies the parent entity (the airframe) as well as the position of the entity (first position on the airframe). The entity structure is also associated with a hierarchy type which is in turn associated with an entity type.

FIG. 7 illustrates an example of an entity and its associated tracked characteristic. The entity table includes fields for ID number, entity type ID number, hierarchy type ID number, and last update effective date. The entity table is linked to the entity type table through the entity type ID number, and is linked to a tracked characteristic table through the entity ID number. The tracked characteristic table includes an entity ID field and a characteristic ID field. The entity ID field matches the ID number contained within the entity table and links the tracked characteristic table to the entity structure table. The characteristic ID field links the tracked characteristic table to the characteristic type table. The characteristic type table includes the data that drives utilization processing. For example, for a life limited part in an aircraft engine such as a first stage fan disk, the characteristic type may include total time in operation.

Domain models 12 built by system 10 have a flexible and dynamic semantic structure that is orthogonal to the referential integrity of the underlying persistence mechanism. In other words, domain models 12 can be built with a minimal representation in terms of stored information that can be expanded and altered over time, with the preservation of relevant history. Relations maintained in the domain model 12 are found dynamically via search, and therefore they do not coerce the compositional structure, or characteristics of the structure's components. Temporal relations are maintained in a bitemporal fashion, and therefore reasoning about time and events in relation to the modeled structures can be undertaken for arbitrary points in time. Additionally, cases of incomplete temporal or spatial data are handled as natural model states, subject only to the business rules as defined by business logic component 14 of system 10.

A bitemporal database is built from the combination of domain model 12 and the structuring of entities within composites 22 that comprise domain model 12 and the ability to track the history of each entity and its characteristics in an arbitrary fashion. System 10 also records errors and provides an audit trail using system framework logic.

Business logic component 14 of system 10 may not allow certain classes of errors, such as an erroneous edit, to persist. However, because of the issues related to erroneous, missing, or out of sequence data, the system might consider data as being valid (the valid time is accepted as being true at the time of a transaction), but later system 10 can consider new inputs that may augment or even invalidate previous data. Therefore, the complete history of these changes and the original values being replaced may all be kept so that they are available for reprocessing.

The mirrored data and domain models allow information to be stored in a relational database but to be realized as Object Oriented structures in memory. In one preferred embodiment, the object structures are built as Plain Old Java Objects (POJOs). This architecture allows full use of the power of the underlying relational database technology to provide relational operations (project, intersect, etc.) upon the data sets. The POJO-based object model allows the full use of the powerful capabilities of a modern Object Oriented language such as Java™ to implement algorithms and business logic.

An object relational mapping layer (ORM) maintains a consistent mapping between the models. The combination of the mirrored models and the mapping layer provides the foundation necessary to implement the bitemporal database functionality. Attributes such as recorded date, to date, and from date, as evidence in the tracked characteristics table are used to persist temporal information. The entity structure table contains "begin date" and "end date" attributes, as well as keyed attributes for parent and child entity IDs and hierarchy type IDs. This is how elements of composites 22 are related spatially, while maintaining the time interval endpoints that allow the re-creation of composites 22 as they existed during a prior time interval.

The ability to create a bitemporal database from the transaction and history mechanisms is a critical orthogonal mechanism to maintaining a consistent temporal state in domain model 12. A key point is to do this while maintaining the flexibility in domain model 12. Data anomalies are not an issue because system 10 can correct to a "best known state" at any time when new inputs arrive.

The specialized form of attribute (tracked characteristic) 36 can hold time-varying streams for characteristic 34. Characteristic 34 may be applied to any entity 24 within composite 22. Characteristic 34 can represent dynamic characteristics or static characteristics. Rather than relying on a fixed index/time relationship, characteristic 34 can represent time series, as well as slowly changing data that carries its own timestamp. Entities 24 may stand alone, or the entities may be combined into composites 22. Advantageously, system 10 is extremely flexible, because composites 22, as well as the entities 24 that make up the composites, can be completely arbitrary in structure. The structure of composite 22 can comprise many levels or no levels at all, depending on the available information for a given object being represented. System 10 allows an object to be modeled using as many or as few structural levels as desired.

In one exemplary embodiment, system 10 forms a part of an On-Wing Tracker (OWT) application of an Advanced Diagnostics and Engine management System. As part of the OWT application, system 10 calculates the utilization of a particular configuration of a given engine at a particular time. Typical utilization characteristics that can be tracked and calculated by system 10 include the following:

| | |
|---|---|
| Time Delta | N1 Cycles Delta |
| Cycles Delta | Total Time |
| Starts Delta | Total Cycles |
| Flight Hours Delta | Time Since Last Visit |
| Cycles Since Last Visit | Module N1 Cycles Since Last Visit |
| Time Since Repair | |
| Cycles Since Repair | Module N1 Cycles Since Performance Restoration |
| Time Since Last Maintenance | |
| Cycles Since Last Maintenance | Module N1 Cycles Since Repair |
| Time Since Overhaul | Engine Starts Since Last Visit |
| Cycles Since Overhaul | Engine Flight Hours Since Last Visit |
| Time Since Bench Test | |
| Cycles Since Bench Test | Total Engine N1 Cycles |
| Times Repaired | Part Starts Since Inspection |
| De-rate | Part Starts Since Repair |
| Average Ambient Temperature | Component Starts Since Bench Check |
| Total Module Flight Hours | |
| Total Module Starts | Part Starts Since Overhaul |
| Module Starts Since Heavy Maintenance | Part Total Starts |
| | Part Flight Hours Since Inspection |
| Module Starts Since Last Repair | |
| Module Starts Since Last Visit | Part Flight Hours Since Repair |
| Module Starts Since Performance Restoration | Component Flight Hours Since Bench Check |
| Module Flight Hours Since Heavy Maintenance | Part Flight Hours Since Overhaul |
| | Part Total Flight Hours |
| Module Flight Hours Since Last Visit | Part Total N1 Cycles Since Inspection |
| Module Flight Hours Since Performance Restoration | Part N1 Cycles Since Overhaul |
| | Part Total N1 Cycles |
| Module Flight Hours Since Repair | Total Part Buried Flaw cycles |
| Total Module N1 Cycles | Total Part Low Fatigue cycles |

-continued

| | |
|---|---|
| Module N1 Cycles Since Heavy Maintenance | Aircraft Total Time |
| | Aircraft Total cycles |
| Engine Operating Time | In-Flight Time |

Figure 8:
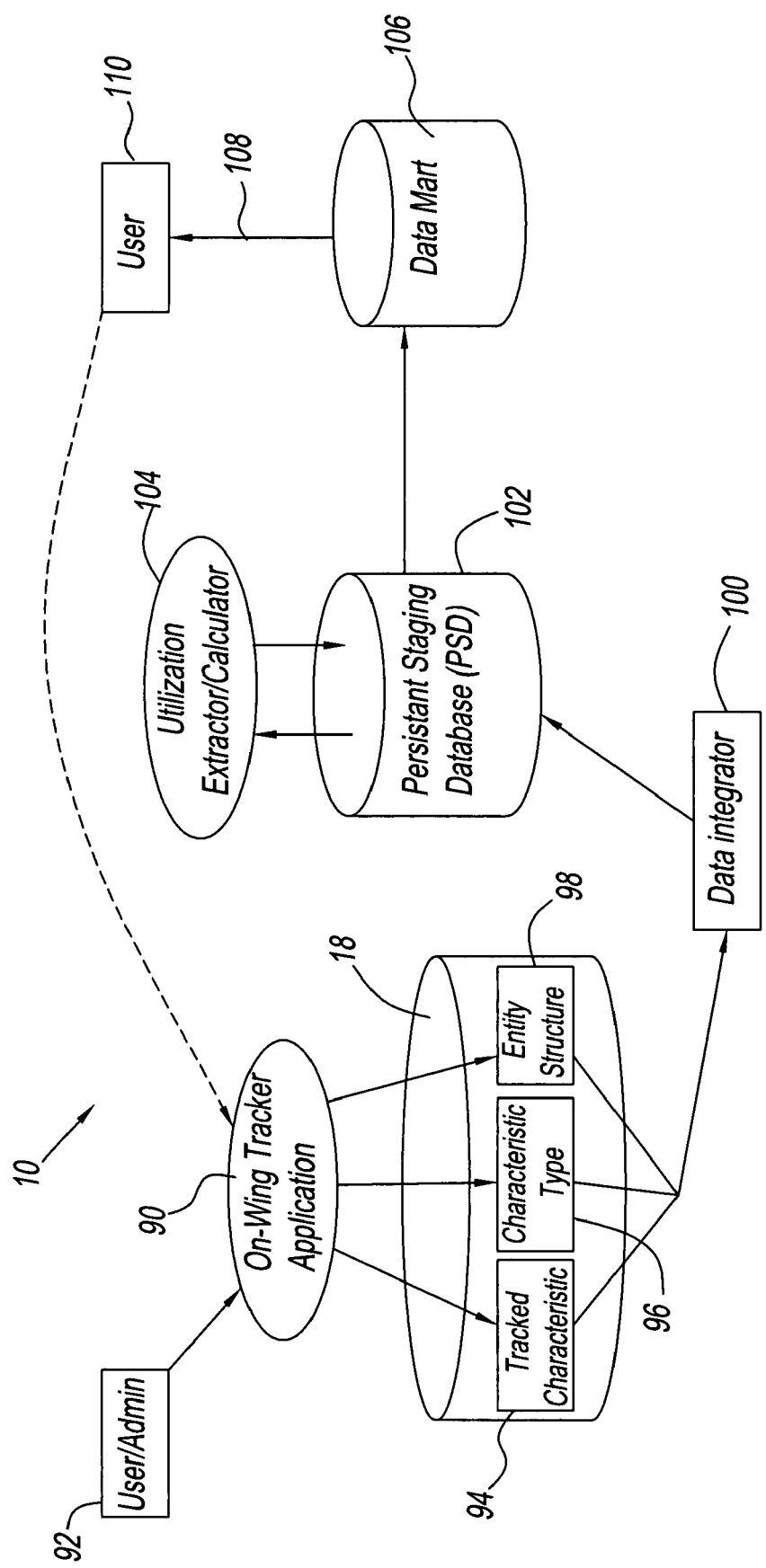
FIG. 8 illustrates an exemplary embodiment of the system of the present disclosure.

FIG. 8 illustrates an embodiment of system 10 incorporating the On-Wing Tracker for an aircraft engine. Using the On-Wing Tracker application 90, an administrator 92 can load data, retrieve and modify existing data, add new entities 24, or change configurations by "moving" entities 24 to indicate that the entities 24 are installed in different composites 22. OWT application 90 inserts and/or updates the results of these interactions principally into three schema tables within database 18: tracked characteristic table 94, characteristic type table 96, and entity structure table 98. Tracked characteristic table 94 contains the actual tracked data for characteristic 34, including utilization data and non-utilization data. Characteristic type table is a reference table describing characteristics 34. Entity structure table 98 defines pair-wise installation of an entity (child) within another entity (parent) and the time span of this installation. Expanding the table for a given point of time forms the entire configuration at that time.

Any change, such as an insertion, update, or deletion, made to tables 94, 96, 98 is added in real-time to the counterpart table in a change-data-capture schema, and the changes are sent to a data integrator 100. Data integrator 100 copies the changes to populate an input table stored in persistent staging database (PSD) 102. Utilization extractor/calculator 104 uses the data stored in the PSD to compute the allocation of the changes that have been inputted. This calculation process is an analog of the processing that occurs when an end user materializes the information for specific entities by interacting directly with system 10 using OWT application 90. Calculator 104 writes its output into a work table in PSD 102 that specifies the accumulative value for each requested entity, characteristic, and time. An internal process then stores the results in a PSD history table. Thereafter, a separate workflow uses that data to populate a utilization fact table within a data mart 106. A user 110 can then use reporting tool 108 to access the configuration and utilization data within data mart 106 via reports and queries.

Figure 9:
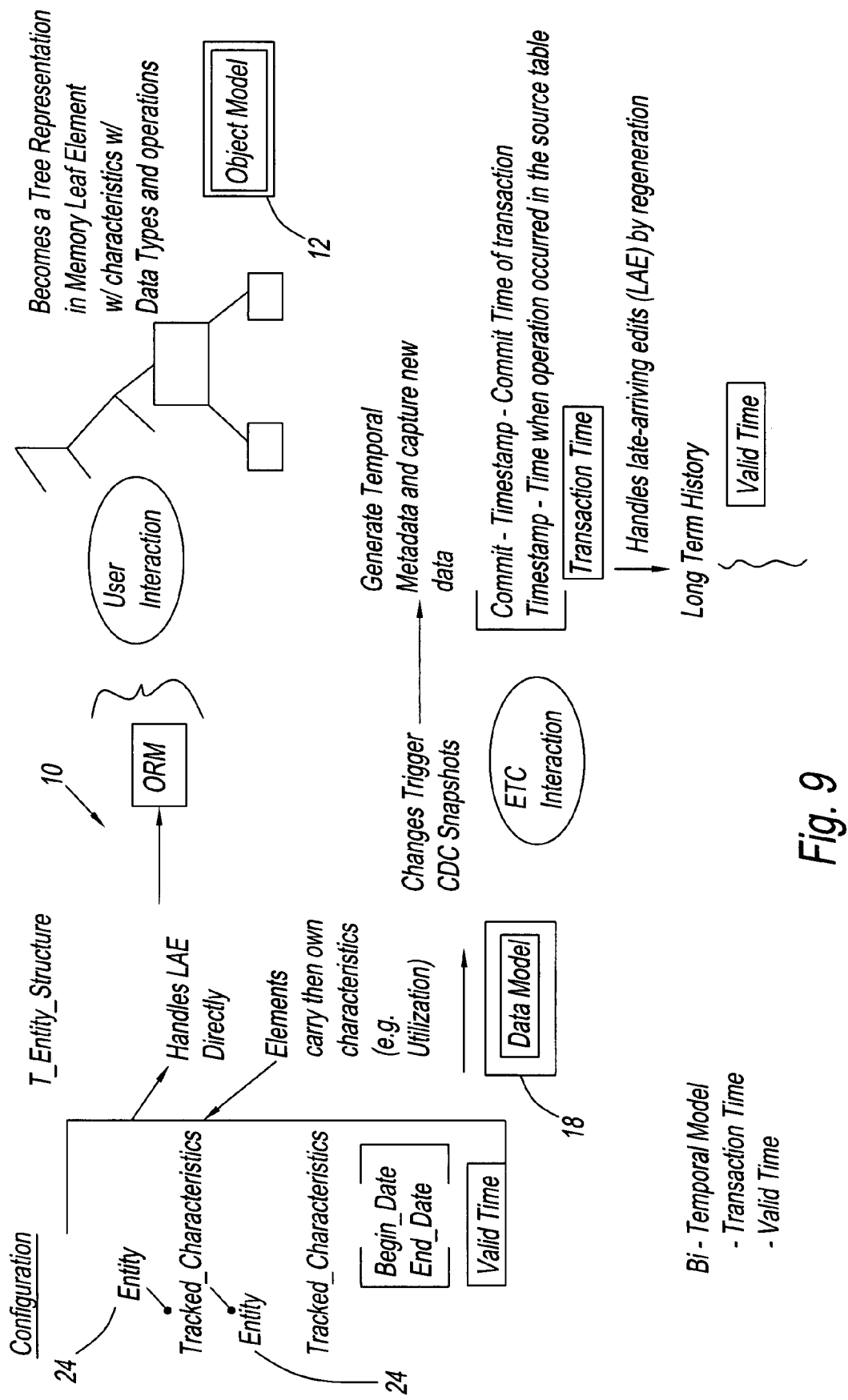
FIG. 9 illustrates another exemplary embodiment of the system of the present disclosure.

As illustrated in FIG. 9, system 10 calculates the utilization of entities 24 that make up composite 22. To do this, system 10 must represent a variety of information concerning entities 24 and characteristics 34 in domain model 12. This information may also include historical information and/or values regarding entities 24. A user of system 10 may choose to represent different types of physical assemblies. The user may also choose to model and track only a subset of entities 24 that make up composite 22. For example, for a given aircraft engine, a user may choose to model and track only the low pressure compressor and its associated subassemblies. Occasionally, the information concerning entities 24 may be missing, or erroneous, or arrive out of order. Therefore, system 10 must account for such possibilities when representing, storing, and processing information.

When transactions occur against a specific composite 22, reprocessing forms new values using previous utilization baselines and then recalculates new deltas where appropriate. A delta value is used when system 10 is representing an accumulating value over the particular time period being represented. The algorithms work by navigating the dynamic structures of composite 22 that maintain entities 24 and relationships between entities 24. The reprocessing propagates by navigation, reprocessing an entity 24 and reprocessing its children. The parent-child relationship is maintained via the composite structure. Advantageously, in system 10 composites 22 are capable of infinite spatial qualification without modifying any of the algorithms being applied.

Various types of utilization information can be maintained and processed by arbitrarily associating one or more characteristics with a particular composite 22 or an individual entity 24 of the composite. System 10 is also capable of infinite temporal qualification since the history can be arbitrarily deep as well. The algorithms can be arbitrarily complex, since characteristics can be freely applied and combined against any entity or composite in domain model 12.

Advantageously, different Bills of Material (BOM) structures can easily be created using system 10. Many situations that might trigger schema evolution and/or data migration in the underlying data model are minimized or avoided altogether due to the inherent genericity of the design of system 10.

Advantageously, system 10 can create domain model 12 in which only the exact components of interest need to be represented, as opposed to all inclusive techniques that represent every single element when only a small fraction of the elements are of interest. For example, a user may be concerned with only a handful of life-limited parts of an aircraft engine, when the engine contains thousands of parts in total.

In system 10, facts and history of facts and their relationship to a physical element at a point in time exist at the same logical level. Relationships keyed off the basic entity structuring mechanism have a time interval basis for their relationship. This allows the understanding of which entities 24 make up a composite 22 at any given point in time. This transforms the entire spatio-temporal solution space into an "algorithm application via navigation/association via search." Therefore, the application of any algorithm is generic and the entire system 10 is dynamic.

This logic holds true for any state change, such as when new entities 24 are added to composite 22 using system 10, or when old entities 24 are deleted from composite 22. This is important when tracking different characteristics 34 and utilizing different algorithms because system 10 is indifferent to such recombination. Advantageously, this allows system 10 to handle late-arriving edits.

Utilization can also be handled in a "lazy" fashion. Typically, utilization is calculated on demand. This prevents the system from having to reflow the calculation whenever there is a change in structure, characteristics or history. Utilization can also be calculated asynchronously, as part of either an individual calculation or as part of a batch process. This is done deliberately because these processes can become fairly complex.

System 10 implements a technique termed shallowest depth reprocessing. While the structure of composite 22 can be arbitrarily extended, for purposes of history, only the top-level parent node must carry the required utilization data. In other words, the entire assembly exists intact and has experienced the effects of utilization as a whole. Therefore, there is no need to calculate utilization individually when there is a common history for the entire composite. The data of child nodes can be inferred to have the same value as the data of a parent node.

Composite 22, as well as entities that make up composite 22, can be arbitrarily sparse in terms of spatial as well as temporal data. Conversely, composite 22 can be extended indefinitely, and utilization characteristics can be arbitrary for every entity 24, and each such characteristic can be tracked to have its own historical dimension as well.

Additionally, if the historical data processing becomes too burdensome, it can be rolled out to other tables and the final values remaining are derived as a "collapse to a baseline" as the summation of the historical data before it is off-lined. Thus, the entire graph can be reduced to a "snapshot" from the standpoint of historical data.

Many important classes of problems are now solvable because system 10 can deal with the fact that specific valid time attributes (e.g. time in service) of an entity 24 (e.g. fan blade) can be handled without regard to the temporal ordering or completeness of data entry for that attribute. System 10 will correctly calculate (reprocess) an attribute (utilization) of an entity 24 based on all of the available information. Data can arrive out of order. Data can be missing entirely. In this case, parent information can be utilized. For example, if the inception date of super-assembly is known, but not the sub-assembly (child), the sub-assembly will take on the utilization of its containing assembly (parent).

System 10 does not impose either qualitative or quantitative limitations due to the flexibility and genericity inherent in the system. Certain optimization can be performed based on the representation of information within the composite 22 as a single entity whereby the root entity carries data that is germane to the entire composite 22. For example, a parent entity for a composite 22 representing a new aircraft engine carries the utilization hours for the entire engine. Because all of the parts on the engine are the original parts, the entire assembly has undergone the same history (utilization). Therefore, there is no need to visit the rest of the entities 24 that make up the composite 22, since the utilization of entities 24 is already understood by definition.

Calculation optimizations can be realized because of the composite structure. Shallowest depth reprocessing will only descend the composite tree as deep as necessary. Child composites with the same lifetime can be dealt with as a single (parent) entity as opposed to visiting and performing processing on every member entity in the composite. Conversely, a child can begin to be handled on an individual basis. For example, when a part is changed, system 10 understands that the historical processing must now handle a leaf node (e.g. a part) as opposed to dealing with it as a part of a composite (e.g. and engine). In this case, the shallowest depth reprocessing is now also the deepest depth reprocessing. The deepest item will no longer accept the history of its parent because its physical existence (history) is now deemed independent of the parent. Metadata, semantics, and relations are found dynamically via search, and therefore do not coerce the compositional structure, characteristics of the components, or their temporal information.

As shown in FIG. 9, when system 10 is interacting directly with a user, the system materializes a tree structure in memory that contains both configuration characteristics and associated utilization characteristics. System 10 processes these characteristics and computes the appropriate values on demand for the user. It also allows the user to edit either the configuration or the utilization values, and reprocesses any new values at that time. If the user desires, this information is saved in a transactional store in the relational DBMS 20. The store then serves as a basis for regeneration of data mart 106.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

The invention claimed is:

1. A method for creating a dynamic domain model of a physical object, the method comprising:
    storing and organizing temporal information about the object into a bitemporal database that includes both a valid time and a transaction time for the information, the information being inserted into a plurality of tables in a data model of the database to thereby persist the information in computer-readable memory, wherein the data model provides information storage separate from object oriented structures in an object model that defines relations;
    assigning a key to each of the plurality of tables;
    searching the temporal information persisted in the data model dynamically to find relations;
    materializing object oriented structures in the object model that mirrors the relations found dynamically via search;
    forming a composite representing the object in the object model, wherein the composite comprises an expandable hierarchy of entities forming sub-components of the composite, and wherein the composite defines at least part of the dynamic domain model to represent the object as an electronic abstraction of the object;
    processing the composite using business logic implemented with object-oriented programming language; and
    entering additional information about a first entity into the database, wherein the entering additional information about a first entity into the database automatically associates the additional information with child entities of the first entity,
    wherein the composite is formed by inputting the information from the plurality of tables into an object relational mapper,
    wherein the composite is formed as a subset of the bitemporal database to represent a state of the object at the current time or at any previous time by dynamically linking the temporal information by key, based on a business logic and a request made by a user and as a function of the materialized object oriented structures.

2. The method of claim 1, wherein the plurality of tables in the database includes tables comprising information about the relationship between entities.

3. The method of claim 1, wherein the keys are unique identification numbers.

4. The method of claim 1, wherein the object oriented structures are built as plain old java objects.

5. The method of claim 1, wherein the database is a relational database.

6. A system for creating a dynamic domain model of an object, the system comprising:
    a bitemporal database storing temporal information about the object, the database having a data model including both a valid time and a transaction time for the information to persist the temporal information in a computer-readable storage medium;
    a relational database management system managing the bitemporal database;
    an object relational mapper;
    a business logic component in an object-oriented programming language, wherein the data model provides information storage separate from object oriented structures in the business logic component that defines relations,
    wherein the object relational mapper converts the information in the database into a composite representing the object, wherein the composite is formed from object oriented structures in an object model that minors the data by dynamically linking tables within the database based on relationships defined by the business logic component and found dynamically in the data model via search, wherein the relationships defined by the business logic component are represented as data within the database, wherein the composite comprises an expandable hierarchy of entities forming sub-components of the composite, wherein entering additional information about a first entity into the database automatically associates the additional information with child entities of the first entity, and wherein the composite represents a state of the object at the current time or any previous time, the business logic component defining an algorithm for processing the composite;
    an output representing the composite to a user; and
    at least one memory assembly for at least temporarily storing the output and for storing the bitemporal database.

7. The system of claim 6, wherein the object is an aircraft engine.

8. A method for creating a dynamic domain model of an aircraft engine, the method comprising:
    storing and organizing utilization characteristics of the engine in a bitemporal database having a data model that includes both a valid time and a transaction time for the utilization characteristics, the utilization characteristics being inserted into a plurality of tables in the database and thereby persisted in a computer-readable storage medium;
    assigning a key to each of the plurality of tables;
    searching the data model dynamically to find relations, wherein the data model does not persist state information in object oriented programming structures, and wherein the data model provides information storage separate from object oriented structures in an object model that defines relations;
    materializing object oriented structures as a function of searching of the data model,
    wherein the object oriented structures define the object model that mirrors the data model;
    forming a composite representing the engine by forming an expandable hierarchy of entities that comprise sub-components of the engine;
    entering additional information about a first entity into the database, wherein the entering additional information about a first entity into the database automatically associates the additional information with child entities of the first entity; and
    processing the composite using an algorithm in object-oriented programming language,
    wherein the composite is formed to represent a state of the engine at the current time or at any previous time by dynamically linking the information by key, based on a business logic and a request made by a user,
    wherein the composite is formed by inputting the information from the plurality of tables into an object relational mapper, and
    wherein the composite is formed from the object oriented structures.

9. The method of claim 8, wherein the entities comprise at least one entity selected from the group consisting of build groups, modules, and parts.

10. The method of claim 8, wherein the utilization characteristics are at least one selected from the group consisting of time delta, cycles delta, starts delta, flight hours delta, N1 cycles delta, total time, total cycles, time since last visit, cycles since last visit, time since repair, cycles since repair, time since last maintenance, cycles since last maintenance, time since overhaul, cycles since overhaul, time since bench test, cycles since bench test, times repaired, de-rate, average ambient temperature, total module flight hours, total module starts, module starts since heavy maintenance, module starts since last repair, module starts since last visit, module starts since performance restoration, module flight hours since heavy maintenance, module flight hours since last visit, module flight hours since performance restoration, module flight hours since repair, total module N1 cycles, module N1 cycles since heavy maintenance, module N1 cycles since last visit, module N1 cycles since performance restoration, module N1 cycles since repair, engine starts since last visit, engine flight hours since last visit, total engine N1 cycles, part starts since inspection, part starts since repair, component starts since bench check, part starts since overhaul, part total starts, part flight hours since inspection, part flight hours since repair, component flight hours since bench check, part flight hours since overhaul, part total flight hours, part total N1 cycles since inspection, part N1 cycles since overhaul, part total N1 cycles, total part buried flaw cycles, total part low fatigue cycles, aircraft total time, aircraft total cycles, engine operating time, and in-flight time.

11. The method of claim 8, wherein the keys are unique identification numbers.

* * * * *

UNITED STATES PATENT AND TRADEMARK OFFICE
CERTIFICATE OF CORRECTION

PATENT NO. : 7,734,659 B2  Page 1 of 1
APPLICATION NO. : 11/809493
DATED : June 8, 2010
INVENTOR(S) : Jonathan Blake Lori It is certified that error appears in the above-identified patent and that said Letters Patent is hereby corrected as shown below:

Col. 10, line 4,
   delete "minors",
   insert --mirrors--

Signed and Sealed this
First Day of March, 2011

David J. Kappos
*Director of the United States Patent and Trademark Office*